Figure 1:
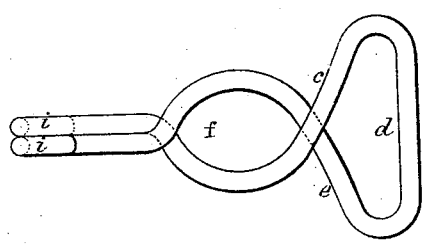
Figure 1:

3 Sheets--Sheet 1.

J. T. FOSTER.
Snap-Hook.

No. 159,313.

Patented Feb. 2, 1875.

Witnesses
H. W. Jerningham
Francis C. Neff

Inventor
John T. Foster

J. T. FOSTER.
Snap-Hook.

No. 159,313.

3 Sheets--Sheet 2.

Patented Feb. 2, 1875.

Witnesses,
H. W. Jennylou
Francis C. Nye

Inventor
John T. Foster

J. T. FOSTER.
Snap-Hook.

No. 159,313.

3 Sheets--Sheet 3.

Patented Feb. 2, 1875.

Witnesses

Inventor
John T. Foster

UNITED STATES PATENT OFFICE.

JOHN T. FOSTER, OF JERSEY CITY, NEW JERSEY, ASSIGNOR TO FRANCIS C. NYE, OF NEW YORK CITY.

IMPROVEMENT IN SNAP-HOOKS.

Specification forming part of Letters Patent No. 159,313, dated February 2, 1875; application filed July 31, 1874.

CASE E.

*To all whom it may concern:*

Be it known that I, JOHN T. FOSTER, of Jersey City, in the county of Hudson and State of New Jersey, have invented certain new and useful Improvements in Snap-Hooks, of which the following is a specification:

My invention relates in general to snap-hooks made of one piece of wire or other flexible and elastic material, composed of loop, swell, and two hooks or close eye, and opening and closing by the elasticity or resiliency of the material. I make these snap-hooks with the arms crossed or locked together between the loop and swell, as well as between the swell and hooks. Each arm may be passed across the other in locking the arms together, or simply crossing them. My improvements are illustrated in snap-hooks having the loop and swell in about the same plane, and the hooks or eye in a plane about at right angles thereto. Viewing these snap-hooks, with the loop horizontal, either arm may be passed over or under the other in crossing the arms next after forming the loop, and where the arms are crossed without locking them together between the loop and swell. That arm which passes over the other next to the loop is passed under the other in crossing the arms or locking them together between the swell and hooks; and that arm which passes under the other next to the loop is passed over the other between the swell and the hooks. The arms are locked together between the loop and swell by first passing either arm over or under and across the other, and then passing that arm which has been crossed above the other under and across it, and that arm which has been passed below the other over and across it. The swell is composed of an outward bend in each arm, and where the arms are locked together, between the loop and swell, the right-hand portions, both of the loop and swell, are formed in one and the same arm, the left-hand portions of the loop and swell being formed in the other arm, while in those snap-hooks which have the arms simply crossed between the loop and swell the right-hand portion of the loop and the left-hand portion of the swell are formed in one arm, and the left-hand portion of the loop and the right-hand portion of the swell are formed in the other arm. In crossing the arms or locking them together between the swell and the hooks either arm may be passed over or under the other in those snap-hooks which have the arms locked together between the loop and swell.

In the accompanying drawings making part of this specification, Figures 1 to 12 inclusive represent, respectively, one side view and one edge view of twelve distinct modifications of snap-hooks containing my improvements. Figs. 1 to 4 inclusive represent snap-hooks having the arms crossed without locking them together between the loop and swell; and the remaining figures represent snap-hooks with the arms locked together between the loop and swell. Figs. 1, 2, 5, 6, 9, and 10, respectively, show the arms locked together between the swell and hooks, while the remaining figures show the arms simply crossed between the swell and hooks, and in the latter class the hooks are formed in the reverse manner to that where the arms are locked together between the swell and hooks, as is clearly shown in the drawings. Figs. 7, 8, 11, and 12 represent snap-hooks in which the loop is round, and in the other figures the loop is square or flat.

Figure 3:
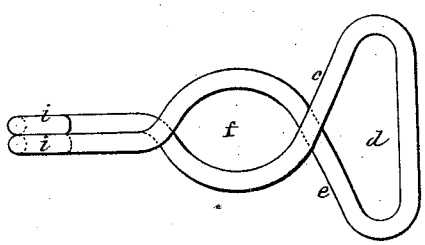
Figure 3:
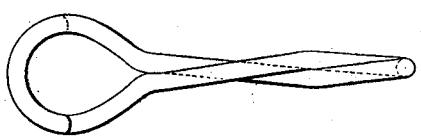
Figure 2:
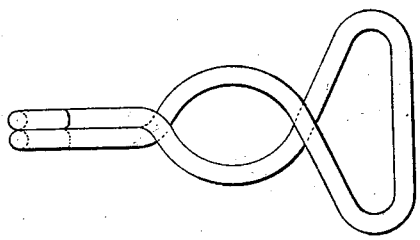
Figure 2:
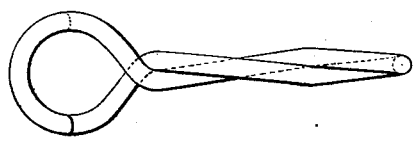
Figure 4:
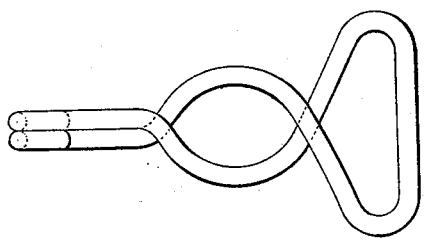
Figure 4:
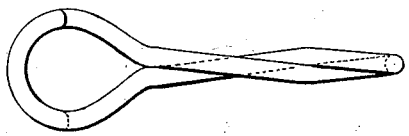

In the snap-hooks shown in Figs. 1 and 3 the right-hand arm *c* is passed over the left *e* in the crossing between the loop *d* and the swell *f*, and under it, in the locking together or crossing of the arms, between the swell and hooks *i*, and conversely the left-hand arm is passed under the right in the crossing between the loop and the swell, and over it on the other side of the swell, while in the snap-hooks shown in Figs. 2 and 4 the left-hand arm is passed over the right in the first crossing, and under it in the second; and the right-hand arm is passed under the left in the first crossing, and over it on the other side of the swell.

The first four figures show the right-hand portion of the loop and the left-hand portion of the swell formed in the right-hand arm, and the left-hand portion of the loop and the right-hand portion of the swell formed in the left-hand arm, while the remaining figures represent the right-hand portions both of the loop and swell as formed in the right-hand arm, and the left-hand portions in the left-hand arm.

Figs. 5, 6, 7, and 8 represent snap-hooks in which the upper arm at the crossing, made next after forming the swell, is the same as the upper arm at the crossing next to the loop, the lower arm being also the same in both of those crossings, while in Figs. 9, 10, 11, and 12 are shown snap-hooks in which the upper arm in the crossing next to the loop is the lower arm in the crossing on the other side of the swell, and the lower arm in the crossing next to the loop is the upper arm in the crossing on the other side of the swell.

Figure 5:
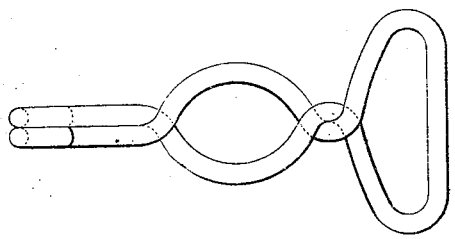
Figure 5:
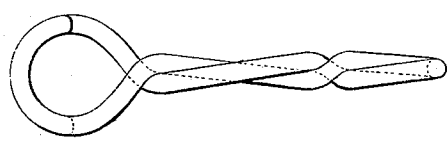
Figure 7:
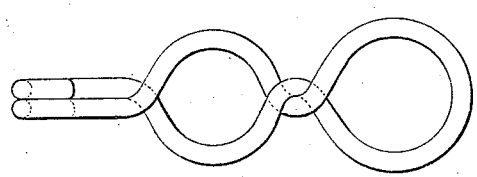
Figure 7:
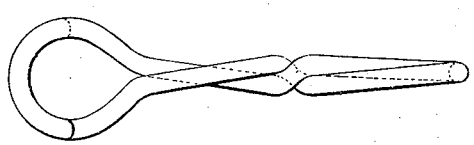

Figs. 5 and 7 represent snap-hooks in which the right-hand arm is passed over and across the left-hand arm, and the left under and across the right next after forming the loop; and then the right-hand arm is passed under and across the left, and the left-hand arm over and across the right; and after forming the swell the right-hand arm is passed, as in the first crossing, over and across the left, and the left-hand arm under and across the right.

Figure 6:
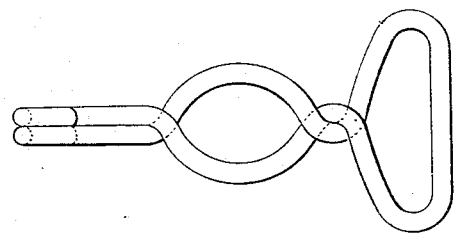
Figure 6:
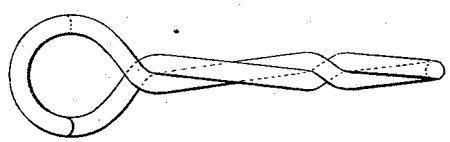
Figure 8:
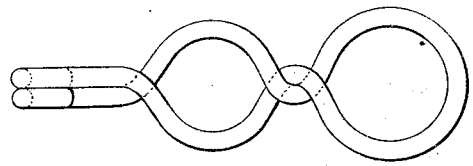
Figure 8:
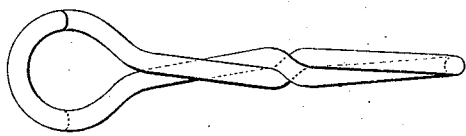

Figs. 6 and 8 represent snap-hooks in which, after forming the loop, the left-hand arm is passed over and across the right, and the right-hand arm under and across the left; and then the left-hand arm is passed under and across the right, and the right-hand arm over and across the left; and after the swell is formed the left-hand arm is passed again over and across the right, and the right-hand arm, as in the first, crossing under and across the left.

Figure 9:
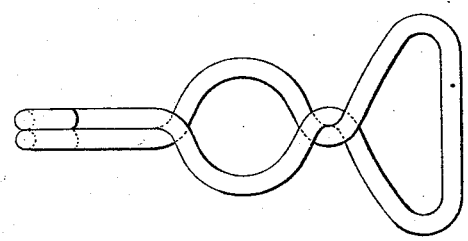
Figure 11:
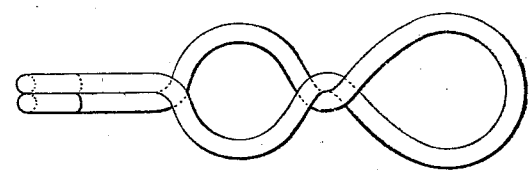
Figure 11:
Figure 11:
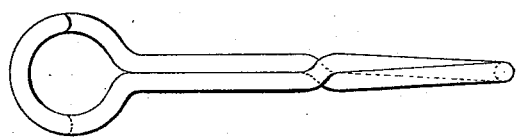
Figure 10:
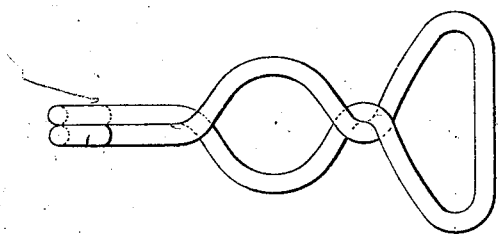
Figure 12:
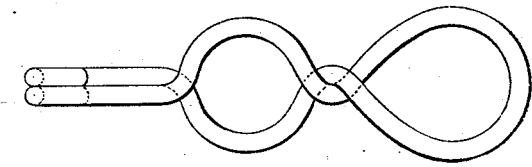
Figure 12:
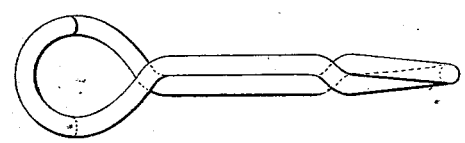
Figure 12:
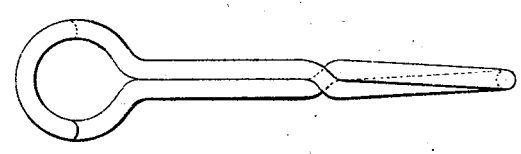

In Figs. 9 and 11 the arms are shown locked together between the loop and swell, in the same manner as in Figs. 5 and 7; and the locking together of the arms between the loop and swell in the snap-hooks shown in Figs. 10 and 12 is the same as in those represented in Figs. 6 and 8. The right-hand arm in the snap-hooks shown in Figs. 9 and 11 having been passed over and across the left-hand arm in the crossing formed next after making the loop, is passed under and across the left in the crossing made next after forming the swell, and the left-hand arm is passed over and across the right in the latter crossing, having been passed under and across the right in the crossing next to the loop.

In Figs. 10 and 12 the right-hand arm is shown below the left in the crossing made next after forming the swell, and above the left in the crossing next to the loop, the left-hand arm being shown below the right in the latter crossing, and above it in the former.

Snap-hooks containing my improvements may be made wholly or in part by machinery; and I prefer to mill or dress off the ends of the piece of wire to a round, tapering, or other desired form after it is cut off and before bending and forming it into a snap-hook.

By compressing the swell the hooks are opened, and allow a ring, link, or other article to pass between them; and upon relieving the swell from this pressure the hooks spring close together again, leaving the ring hanging securely on them.

The snap-hook may be conveniently taken off the ring, or other article to which it is attached, by bringing the ring to bear on the close part of each hook, which is between the ends of the hooks and the point where the arms are crossed before forming the hooks, and then turning the snap-hook on the ring, so that the mutual leverage of the arms opens the hooks, and the snap-hook may be pulled easily off the ring. The arms are sprung apart, where they are locked together on either side of the swell by compressing the swell between the thumb and forefinger, and thus the elasticity of the whole piece of which the snap-hook is made aids in opening the hooks with great ease.

In snap-hooks heretofore made of one piece of wire without crossing the arms or locking them together between the loop and swell the hooks have been liable to slide upon each other, and thus became easily displaced in use, destroying the form of the snap-hook, and rendering it unfit for use. I have removed this defect by crossing the arms, or locking them together between the loop and swell, whereby the hook formed in either arm is prevented from sliding or springing to one side by the resistance offered by the other arm at the crossing or locking together of the arms between the loop and swell.

I believe I am the first person who has ever formed a snap-hook having a swell in its sides in the same plane as the loop, or otherwise with the arms crossed or locked together between the loop and the swell.

What I claim as my invention, and desire to secure by Letters Patent, is—

1. The combination of the loop and swell of a snap-hook with the arms crossed between them, substantially as described.

2. The improved snap-hook, constructed with loop, swell, and eye, and having the arms crossed on both sides of the swell, substantially as described.

JOHN T. FOSTER.

Witnesses:
H. W. ZERINGTON,
FRANCIS C. NYE.